United States Patent
Poulin et al.

(10) Patent No.: US 7,906,208 B2
(45) Date of Patent: Mar. 15, 2011

(54) COMPOSITE FIBERS INCLUDING AT LEAST CARBON NANOTUBES, METHODS FOR OBTAINING SAME AND USE THEREOF

(75) Inventors: Philippe Poulin, Talence (FR); Thibaud Vaugien, L'Union (FR)

(73) Assignee: Centre National de la Recherche Scientifique—CNRS

( * ) Notice: Subject to any disclaimer, the term of this patent is extended or adjusted under 35 U.S.C. 154(b) by 572 days.

(21) Appl. No.: 11/666,117

(22) PCT Filed: Oct. 26, 2005

(86) PCT No.: PCT/FR2005/002680
§ 371 (c)(1),
(2), (4) Date: Aug. 14, 2007

(87) PCT Pub. No.: WO2006/048532
PCT Pub. Date: May 11, 2006

(65) Prior Publication Data
US 2008/0124507 A1 May 29, 2008

(30) Foreign Application Priority Data
Oct. 29, 2004 (FR) ...................................... 04 11604

(51) Int. Cl.
*D02G 3/00* (2006.01)
(52) U.S. Cl. ........................................ 428/372; 428/370
(58) Field of Classification Search .................. 428/372, 428/367, 370; 424/443; 623/1.42
See application file for complete search history.

(56) References Cited

U.S. PATENT DOCUMENTS

| | | | | |
|---|---|---|---|---|
| 5,364,627 A * | 11/1994 | Song | | 424/443 |
| 5,457,343 A * | 10/1995 | Ajayan et al. | | 257/734 |
| 5,747,161 A * | 5/1998 | Iijima | | 428/367 |
| 6,153,299 A * | 11/2000 | Smith et al. | | 428/372 |
| 7,094,467 B2 * | 8/2006 | Zhang et al. | | 428/372 |
| 7,144,422 B1 * | 12/2006 | Rao | | 623/1.42 |
| 7,288,317 B2 * | 10/2007 | Poulin et al. | | 428/370 |
| 7,323,540 B2 * | 1/2008 | Velev et al. | | 528/502 F |
| 7,425,368 B2 * | 9/2008 | Boyce et al. | | 428/372 |
| 2003/0102585 A1 * | 6/2003 | Poulin et al. | | 264/11 |
| 2004/0177451 A1 * | 9/2004 | Poulin et al. | | 8/115.51 |
| 2006/0121275 A1 | 6/2006 | Poulin et al. | | |
| 2009/0072192 A1 * | 3/2009 | Seal et al. | | 252/182.33 |

FOREIGN PATENT DOCUMENTS

| | | |
|---|---|---|
| CN | 1418268 | 5/2003 |
| FR | 2 805 179 A1 | 8/2001 |
| FR | 2 828 500 A1 | 2/2003 |
| FR | 2 854 409 A1 | 11/2004 |
| WO | 01/63028 | 8/2001 |

OTHER PUBLICATIONS

Joseph N. Barisci et al., "Properties of Carbon Nanotube Fibers Spun from DNA-Stabilized Dispersions," Advanced Functional Materials, vol. 14, No. 2, Feb. 2004, pp. 133-138.

* cited by examiner

*Primary Examiner* — N. Edwards
(74) *Attorney, Agent, or Firm* — DLA Piper LLP (US)

(57) ABSTRACT

Composite fibers including carbon nanotubes, at least one other type of particles provided in colloidal form and intimately and evenly mixed with the carbon nanotubes wherein the particles are evenly dispersed throughout the whole body of the fibers.

5 Claims, 1 Drawing Sheet

COMPOSITE FIBERS INCLUDING AT LEAST CARBON NANOTUBES, METHODS FOR OBTAINING SAME AND USE THEREOF

RELATED APPLICATION

This is a §371 of International Application No. PCT/FR2005/002680, with an international filing date of Oct. 26, 2005 (WO 2006/048532, published May 11, 2006), which is based on French Patent Application No. 04/11604, filed Oct. 29, 2004.

TECHNICAL FIELD

This disclosure relates to composite fibers comprising at least carbon nanotubes, methods of obtaining them and their applications.

BACKGROUND

Natural or synthetic fibers used as textiles or compounded extenders are often coated with additives. This coating has the aim of modifying the surface properties of the fiber or granting it a specific functionality. In certain cases, the term "bonding" can be used. For example, the so-called "textile" bonding applied to filaments output from a spinneret consists of depositing a bonding agent ensuring cohesion of the filaments with each other, reducing abrasion and facilitating subsequent handling (weaving) and preventing the formation of electrostatic charges. There are other cases wherein a fiber must be covered with a specific compound. For example, it is possible to dye a fiber simply by coating it with dyeing agents. An initially insulating textile fiber can be made conductive by coating it with conductive polymers. It is possible to perfume a garment of clothing by coating its fibers with capsules containing a perfume. These are only a few examples among a multitude of industrially developed and commercially available cases.

Conventional fiber coating results in uniform, symmetric coating of its surface.

It is preferable, however, in certain cases to add an additive to a fiber in a different manner, which is to say inside the fiber and not on the surface. These different conditions make it possible to improve the properties of the fiber, allowing it to be used for new functions.

Carbon nanotubes have a structure and electronic and mechanical properties which make them very promising materials for many applications: composites, electromechanical actuators, cables, resisting wire, chemical detectors, hydrogen storage, electron-emitting displays, energy converters, electronic components, electrodes, batteries, catalysis media or the like.

Multiple methods exist for manufacturing carbon nanotube fibers.

In particular, carbon nanotubes as well as other types of particles can be arranged in the shape of ribbons or fibers by a patented spinning method (FR 2 805 179). That method consists of homogeneously dispersing the nanotubes in a liquid environment. The dispersion can be carried out in water using surface-active agents which are adsorbed at the interface of the nanotubes. It can also be obtained from functionalized nanotubes, without using any dispersants. Once dispersed, the nanotubes are re-condensed in the form of a ribbon or a pre-fiber by injecting the dispersion into another liquid causing the nanotubes to coagulate. This other liquid can be a solution of polymers. The flows used are optimized to promote alignment of the nanotubes in the pre-fiber or the ribbon. Moreover, the flow speeds and rates also make it possible to control the cross-section of the pre-fibers or ribbons. The pre-fiber is then dried, resulting in a fiber containing a considerable fraction of nanotubes. The ribbons, pre-fibers or final fibers can be treated by stretching in a wet method to improve the direction of the nanotubes. These reshaping methods are described in FR 01/10611. That patent shows how dynamically or statically stretching the fiber in solvents with a higher or lower affinity for the coagulating polymer makes it possible to improve the structure and the physical properties of the fibers.

The pre-fibers, ribbons or fibers can also be washed by rinsing which makes it possible partially or entirely to desorb certain adsorbed species (in particular, coagulating or surface-active polymers).

The properties of these fibers, as those of any other fibers, depend in a critical manner on the nature and arrangement of their components.

It can be desirable, in particular, to add an extra component to the fiber to improve its properties or grant it a particular function (optical, bio-activity, electrical or thermal properties, oxidation-reduction properties, catalytic properties, bactericidal properties, mechanical properties or the like). Currently, these improvements or functions can only be controlled by the nature of the molecules used when synthesizing the fibers. This is a serious limitation since it is not obvious to combine a given function with the conditions required to manufacture the fiber. It is therefore ideal to add these additives when synthesizing the fibers, since the additives can then be located inside the fibers. They are better protected this way. They are in direct contact with all the nanotubes, directly affecting the properties of the fiber.

However, the addition of molecular additives during synthesis greatly complicates the spinning process and can even make it impossible. For example, a molecule with a specific function can turn out to be harmful for the coagulation of the nanotubes or even for the stability of the initial dispersion. Likewise, the molecules designed to be added might not be compatible with the spinning process, if they are simply not soluble in the solvents used. For one or more of these reasons, the molecules are not added when manufacturing the fibers. They must be deposited at the end on the fibers once manufactured. However, post-synthesis coating, which is standard in spinning and textile technologies, also has limitations insofar as it does not allow a specific compound to be placed inside the fibers. The additives remain localized on the surface, which restricts their action and their effect on the fiber.

SUMMARY

We provide composite fibers including carbon nanotubes, at least one other type of particles provided in colloidal form and intimately and evenly mixed with the carbon nanotubes wherein the particles are evenly dispersed throughout the whole body of the fibers.

We also provide a method of obtaining the fibers including dispersing the colloidal particles with the nanotubes in a solvent, optionally with help of a surface-active agent, and injecting a dispersion solution thus obtained through at least one orifice opening into a flow of an external solution with a viscosity that is higher than that of the dispersion, the viscosities being measured with the same conditions of temperature and pressure to cause an aggregation of the particles and nanotubes in fibers or ribbons by destabilizing the dispersions of particles and a possible alignment of the particles and the nanotubes.

DETAILED DESCRIPTION

The IUPAC standard defines colloidal particles, in general terms, as being particles with a size comprised between 1 nanometer and several micrometers. We refer to this definition whenever we use the term "colloidal particles".

For this purpose, the composite fibers comprising at least carbon nanotubes comprise at least one other type of particles added in colloidal form and intimately and evenly mixed with the carbon nanotubes wherein the particles are evenly dispersed throughout the whole body of the fiber.

The particles are preferably particles of polymers, mineral particles, metal particles, metal oxide particles, drops of emulsion and/or capsules of active molecules.

In particular, the polymers are chosen from among electrically conductive polymers, electrically insulating particles, thermosetting polymers and/or thermoplastic polymers.

More particularly, the polymers are chosen from among cellulose, phenolic resins and/or PAN.

In particular, the mineral particles are chosen from among alumina, silica, titanium dioxide, calcium carbonate, silica carbide, tungsten sulphide, boron nitride and/or clay platelets.

In particular, the metal particles and the metal oxide particles are chosen from among platinum, palladium and/or iron and/or cobalt based magnetic particles.

In particular, the drops of emulsion are chosen from among liquid monomers of a substance designed to polymerize in solid form.

In particular, the active molecules are chosen from among drugs, perfumes, bactericides and/or pesticides.

Finally, the fibers are obtained by:
dispersing the colloidal particles with the nanotubes in a solvent, possibly using a surface-active agent, and
injecting a dispersion solution thus obtained through at least one orifice opening into a flow of an external solution, preferably with a viscosity that is higher than that of the dispersion, the viscosities being measured with the same conditions of temperature and pressure, to cause an aggregation of the particles and the nanotubes in fibers or ribbons by destabilizing the dispersions of particles and a possible alignment of the particles and the nanotubes.

The main element comprises adding the additives in colloidal form, which is to say in the form of particles with a size comprised between several nanometers and several micrometers. The additives are not added in molecular form. The addition in colloidal form has considerable technical advantages.

The compound is added during the nanotube dispersion step. The physico-chemical conditions of the spinning process (dispersion and coagulation) are not affected, since the additives are added in colloidal, not molecular, form.

In particular, the fibers can have numerous applications, mainly including manufacturing microelectrodes, sensors, mechanical actuators, high-performance fibers, textiles and/or catalysis media.

Figure 1:
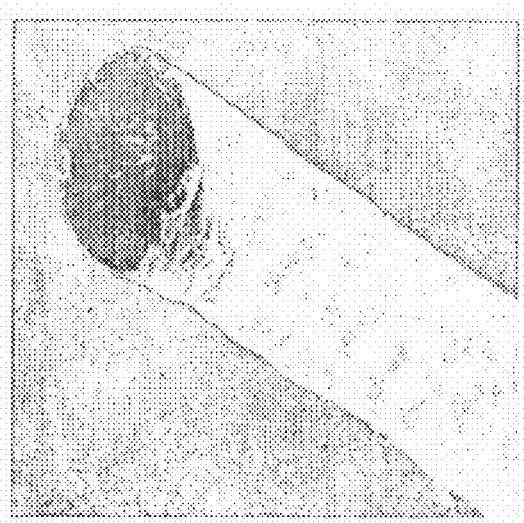
FIG. 1 shows a scanning electron microscopy photograph of a composite fiber.

In the various examples below, colloidal particles are added to an initial solution of nanotubes. These examples are carried out using latex particles (polystyrene nanoparticles in an aqueous solution) in colloidal form with a diameter of 60 nm (example 1), 30 nm silica particles (example 2), and finally clay nanoparticles (example 3). The dispersion contains nanotubes and added colloidal particles. The proportion of colloids and nanotubes, controlled by the experimenter, can be variable. This mixed dispersion is then injected into a nanotube coagulation bath as described in FR 2 805 179. The nanotubes and colloids coagulate to form a wet pre-fiber which can be subjected to various treatments prior to being dried. Among these treatments are washing, stretching (static or dynamic) twisting and thermal or chemical treatments. The obtained fiber consists of intimately mixed nanotubes and colloidal particles. It constitutes an even composite. FIG. 1 shows an electron microscope photograph. If the colloidal particles are able to coagulate and merge, as in the example of weakly cross-linked latex, the mix is particularly homogeneous. Indeed, in this case, the colloidal nature of the added particles disappears when they are merged. If more rigid particles are used, such as mineral or metal particles, strongly cross-linked polymers or polymers at their glass transition temperature, the mix remains homogeneous, but the colloidal particles can preserve certain integrity.

It is impossible to manufacture such fibers by directly adding polystyrene in the molecular state. The latter being a non-water soluble polymer, adding it in molecular form is incompatible with the physico-chemical conditions of the spinning process. This system constitutes an example in which the chemical nature of the additive is not compatible with the spinning process. We provide a way around this incompatibility. In addition, silica alkoxides are non-water soluble and their use requires the use of hydroalcoholic solutions, in which the nanotubes are much more difficult to disperse. It is therefore considerably more difficult to make a homogenous nanotube/silica using a method other than that disclosed herein:

The various steps of the method implemented to manufacture the fibers are, for all the examples below:
Dispersion of nanotubes+colloidal particles in controlled proportions,
Coagulation without flow and obtaining a pre-fiber or a ribbon comprising colloids and nanotubes,
Possible treatments (stretching, twisting, chemical or thermal treatments, washing), and
Drying and obtaining the final colloid-nanotube composite fiber preserving the initial proportions. The nanotubes and the colloids are evenly distributed.

Example I

Spinning Characteristics

Pre-fiber obtained by injecting a solution of nanotubes/colloids in the flow of a coagulating polymer solution. The pre-fiber is then dried. The coagulation solution is chosen because it leads to flocculation of the nanotubes but also of the added colloidal particles, in this case latex (polystyrene particles with a diameter of 60 nm).
Nanotubes: Single-walled, synthesized by electric arc.
Nanotube solution: suspensions containing 0.3% by mass of nanotubes, 0.3% of colloidal particles and 1.2% of sodium dodecyl sulphate (dispersant). The suspension is homogenized by ultrasound.
Coagulating polymer solution: aqueous solution of 5% by mass of PVA (molecular mass of 150 kg and hydrolysis ratio of 88%). Injection flow of the nanotube solution: 50 ml/h through a cylindrical orifice with a diameter of 0.5 mm.
Flowing speed of the PVA solution: 10 in/min.

The pre-fiber formed in these conditions is then tempered in 3 rinsing baths with pure water and extracted for drying and compregnation. Its cross-section can be seen in scanning-electron microscopy. This comprises particles included in the network formed by the carbon nanotubes (see FIG. 1).

Unlike fibers that do not contain any added latex, it is difficult to detect the presence of nanotubes that in this case are coated and diluted in a larger polymer matrix. The fiber has the uniform appearance that is typical of a nano-composite material where inclusions are evenly distributed.

The electric resistivity of the fiber at room temperature is 81.2 ohm·cm. This value greatly exceeds the resistivity of a fiber with no latex particles.

Figure 2:
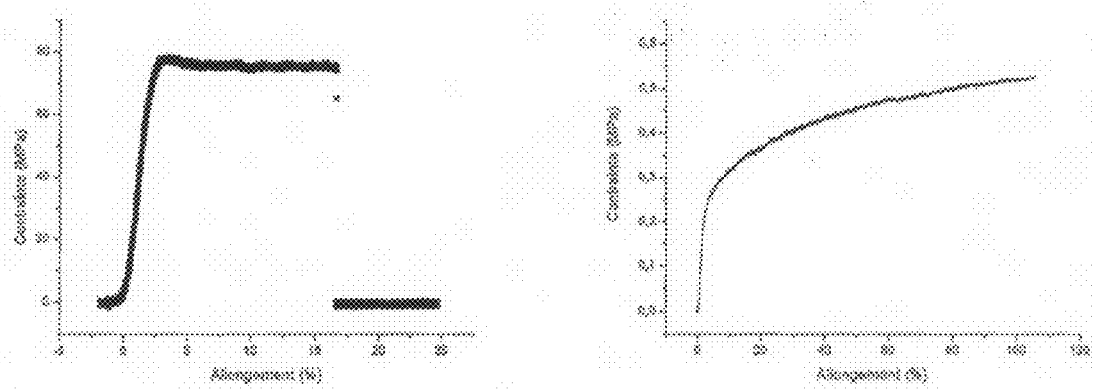
FIG. 2 shows comparative stress diagrams of traditional carbon nanotube fibers (left) and composite fibers.

The resistivity of a fiber with no latex is 1 ohm·cm (typically comparable with the fibers described in FR 0 305 379). This measure clearly shows the effect of including colloidal particles which make it possible to dilute the conductive nanotubes within the insulating polymer matrix. This dilution effect can be used to reduce the conductivity of the fiber but also to produce very porous nanotube fibers after chemical or thermal elimination of the polymer. Indeed, the dilution of nanotubes leads to a less compact network when eliminating the polymer. This method also has a considerable effect on the mechanical properties of the fiber (see FIG. 2). The fiber which contains the latex shows a greater extension of the breakage than a fiber which does not contain latex (110% as against 15%). On the other hand, the maximum breakage stress is reduced (0.6 MPa as against 75 MPa). These characteristics perfectly illustrate the role of the polymer. It renders the fiber more plastic and deformable but reduces its elasticity. Other effects can be expected with different polymers. In this case it is a mere example that shows the enormous influence to be had by including a compound in colloidal form in a fiber.

Example 2

Spinning Characteristics

Pre-fiber obtained by injecting a solution of nanotubes and colloids in the flow of a coagulating polymer solution. The pre-fiber is then dried. The coagulation solution is chosen because it leads to flocculation of the nanotubes but also of the added colloidal particles, in this case silica particles.
Nanotubes: single-walled, synthesized by electric arc.
Nanotube solution: suspensions containing 0.7% by mass of nanotubes, 0.7% of colloidal particles and 1.2% of sodium dodecyl sulphate (dispersant). The suspension is homogenized by ultrasound.
Coagulating polymer solution: aqueous solution of 5% by mass of PVA (molecular mass of 150 kg and hydrolysis ratio of 88%).
Injection flow of the nanotube solution: 5 ml/h through a cylindrical orifice with a diameter of 0.5 mm.
Flowing speed of the PVA solution: 30 ml/min through a cylindrical tube with a cross-section of 8 mm.

The pre-fiber formed in these conditions is then tempered in a rinsing bath with pure water and extracted for drying and compregnation. This fiber contains PVA, silica and nanotubes in equal amounts. The silica particles are added irreversibly and form an even network which is intimately interlocked with the PVA and the nanotubes. A traditional PVA/nanotube fiber (without silica) tends to swell spontaneously and considerably in the presence of water. The fiber retains considerable affinity for water due to the presence of PVA. In the presence of silica, it can be seen that the fiber remains hydrophilic but no longer swells in the presence of water. This result shows that the network of irreversibly added silica particles keeps its overall structure and prevents the fiber from swelling. This marked difference in behavior is a clear illustration of the contribution that an extra compound added in colloidal form, as described herein, can make.

Example 3

The colloidal compound consists of clay platelet nanoparticles.
Spinning Characteristics:
Pre-fiber obtained by injecting a solution of nanotubes and colloids in the flow of a coagulating polymer solution. The pre-fiber is then dried. The coagulation solution is chosen because it leads to flocculation of the nanotubes but also of the added colloidal particles, in this case clay nanoparticles (such as laponite).
Nanotubes: single-walled, synthesized by electric arc.
Nanotube solution: suspensions containing 0.6% by mass of nanotubes, 0.5% of colloidal particles and 1.2% of sodium dodecyl sulphate (dispersant). The suspension is homogenized by ultrasound.
Coagulating polymer solution: aqueous solution of 5% by mass of PVA (molecular mass of 150 kg and hydrolysis ratio of 88%).
Injection flow of the nanotube solution: 5 ml/h through a cylindrical orifice with a diameter of 0.5 mm.
Flowing speed of the PVA solution: 30 ml/min through a cylindrical tube with a cross-section of 8 mm.

For all these examples and for all the fibers, the relative ratio of nanotubes/colloidal particles is fixed by the manipulator when preparing the solutions. This relative ratio can vary by several percent in the event of adding particles designed, for example, to play a catalytic role as a catalyst supported to at least 80% (insofar as the added colloids can be spun by themselves in the absence of nanotubes) in the preceding case.

This control is a considerable advantage for manufacturing composite fibers.

Furthermore, the addition of particles in colloidal form in the fibers can grant new functions to the fibre. For example, the colloidal particles can contain an active agent (drug, bactericide, perfume or the like) and thus grant the fiber very particular functions without needing to modify the carbon nanotubes.

Evidently, various very varied types of colloidal particles can be used and implemented in the fibers. The choice of the latter depends essentially on properties sought for the final composite fibers.

The following non-exhaustive list presents different colloids that can be used and the properties they can grant the fiber:
Polymer particles: composite nanotube/polymer fibers with a larger proportion of polymer.
  The polymer particles can modify the mechanical properties of the fiber.
  They can also comprise polymers (cellulose, PAN) which, by pyrolysis, provide the amorphous carbon for manufacturing composite carbon/carbon nanotube fibers.
  On the other hand, they can comprise polymers eliminated by thermal treatment to result in highly porous nanotube fibers (the eliminated particles leave holes in the fiber). Highly porous fibers are desirable for electrochemical applications (electrodes, sensors, actuators), adsorption of molecules (hydrogen storage, ion adsorption for batteries) and catalysis application.

The polymers can be of the conductive type to improve the electric properties of the fiber.

Mineral particles: composite nanotube/mineral particle fibers.

The particles can be alumina, silica, titanium dioxide, calcium carbonate. These particles can grant the fibers, as in traditional composites, improved mechanical properties, reduced permeability to certain molecules, improved temperature resistance. Metal or metal oxide particles: composite nanotube/metal or metal oxide particle fibers.

The particles can, in particular, be magnetic iron or cobalt-based nanoparticles in order to make the fiber magnetic.

The particles can also be metal nanoparticles designed to catalyse a chemical reaction or nanotube growth by CVD inside the fiber.

Capsules of active molecules: composite nanotube/encapsulated product fibers.

There currently exist numerous colloidal encapsulation technologies for protection and controlled release of active molecules (drugs, perfumes, bactericides, pesticides or the like). Colloidal capsules can be included inside nanotube fibers by this method, thereby granting them specific functions such as, for example, gloves containing bactericidal capsules. Such products exist today for protecting the user when the glove is cut by an infected object (blade, syringe). When cut, the glove releases a bactericide that acts immediately in order to protect the user against a possible infection. Highly persistent nanotube fibers are precisely promising systems for their use in the protective clothing textile fabrics. Such functions therefore constitute an additional advantage for this field of application. Another example can be given with perfume capsules. Such capsules are more effective inside the fiber than on the surface, since their retention time is considerably increased. Finally, a further example relates to particles of organic products that can melt at temperatures near room temperature (capsules of certain waxes). Due to their enthalpy, the capsules tend to cool the fiber when the outside temperature rises. Such textiles were developed by NASA during the 1990s. They enable the production of clothes that limit the feeling of heat when a person moves from a cold place to a warm place. In the opposite manner, when the capsules solidify they heat up and reduce the feeling of cold when a person moves from a warm place to a cold place. On the contrary, as in the case of perfume capsules, it is not ideal to deposit such capsules on the surface of fibers, since the particles degrade through friction or when washing. It would be much more efficient for the longevity of the system for the particles to be inside the fiber.

The invention claimed is:

1. Composite fibers comprising:
   a polymer matrix,
   carbon nanotubes, and
   at least one of metal or metal oxide colloidal particles intimately and evenly mixed with the carbon nanotubes, wherein the carbon nanotubes and the colloidal particles are aggregated to form ribbons or fibers and are evenly dispersed within the polymer matrix and throughout the whole body of the composite fibers.

2. The fibers according to claim 1, wherein the metal oxide particles are titanium dioxide particles.

3. The fibers according to claim 1, wherein the metal particles and the metal oxide particles are at least one selected from the group consisting of platinum, palladium, and magnetic iron and cobalt based particles.

4. Microelectrodes, sensors, mechanical actuators, high-performance fibers, textiles or catalysis supports comprising the fibers according to claim 1.

5. The fibers of claim 1, wherein the polymer matrix is a polyvinyl alcohol polymer matrix.

* * * * *